Patented Feb. 3, 1942

2,272,014

UNITED STATES PATENT OFFICE 2,272,014

COATING UNDESIRABLY PURE MONOCALCIUM PHOSPHATE FOR HEAT TREATMENT

William H. Knox, Jr., Nashville, Tenn., assignor to Victor Chemical Works, a corporation of Illinois No Drawing. Application May 15, 1939, Serial No. 273,809

4 Claims. (Cl. 23—108)

This invention relates to a method of coating undesirably pure monocalcium phosphate for heat treatment and the product thereof.

In my co-pending application, Serial No. 226,180, filed August 22, 1938, of which this application is a continuation-in-part, is described a new crystalline anhydrous monocalcium phosphate. The product therein described is desirably made from a phosphoric acid containing impurities characteristic of blast furnace phosphoric acid. The presence of such impurities produced, upon proper heat treatment, as described in the patent of Julian R. Schlaeger, No. 2,160,232, issued May 30, 1939, a substantially pyrophosphate-free anhydrous monocalcium phosphate having a thin, autogenous, glassy, substantially complete, relatively insoluble coating.

The present invention relates to the preparation of monocalcium phosphate, preferably anhydrous from the beginning, in which for one reason or another it is desired to produce initially an undesirably pure product. Such a pure monocalcium phosphate will not heat treat properly under ordinary circumstances to produce the improved baking acid described in the Schlaeger patent. By means of the present invention, however, undesirably pure materials may be superficially supplied with a thin layer of coating-forming impurities. Once these impurities have been properly applied in such a superficial layer, heat treatment in accordance with the process of the Schlaeger patent will produce anhydrous monocalcium phosphate having thereon a glassy, autogenous, thin, substantially complete and relatively insoluble coating.

The present process may be employed in those instances where undesirably pure monocalcium phosphate is available, or it may be desirable to produce initially undesirably pure monocalcium phosphate in order to eliminate deleterious impurities. For example, magnesium appears to be an undesirable ingredient of the monocalcium phosphate and yet it is always found in the lime of commerce which is the basis of the calcium content of the monocalcium phosphate. Therefore, it may be desirable in some cases to prepare anhydrous monocalcium phosphate by fractional crystallization thereof from a liquor. The resulting product by itself is undesirable for incorporation in a baking preparation because of its instability against hydration. Likewise, it will not properly heat treat. It may, however, be processed by the addition of a superficial layer of coating-forming impurities, particularly alkali metal salts, such as the salts of potassium.

Similarly, the anhydrous monocalcium phosphate of my Patent 2,160,700, issued May 30, 1939, may be produced in undesirably pure form and supplied with a superficial layer of impurities. The process is also applicable to the treatment of dehydrated monocalcium phosphate.

It is sometimes possible to eliminate deleterious impurities in the formation of the monocalcium phosphate where it would be extremely difficult or expensive to remove these impurities from the initial reagents.

The impurities may be applied to the surfaces of the monocalcium phosphate particles by any means which will insure, upon heat treatment, a substantially complete and substantially water-insoluble skin-form of coating. In those instances where the anhydrous monocalcium phosphate is the base to which the impurities are added, the latter may be dissolved in non-hydroscopic solvents or media or may sometimes be applied in dry form. By "hydroscopic" as here employed is meant that the solvent in the form used and under the conditions employed will not yield water in substantial quantities to the anhydrous monocalcium phosphate. For example, a very concentrated aqueous solution, such as concentrated phosphoric acid, would not be considered hydroscopic, nor would a concentrated aqueous solution of other materials be so considered where employed at sufficiently high temperatures such that no absorption of water by the anhydrous monocalcium phosphate occurs.

Preferably, however, non-aqueous solvents such as alcohols, for example ethyl, methyl or butyl, acetone, formic acid or the like, may be employed. For example, an alcoholic solution of potassium hydroxide may be applied to anhydorus monocalcium phosphate particles, and the alcohol evaporated. This leaves a coating of potassium hydroxide upon the surface of the particles, which, upon heating at the proper temperatures, reacts with the monocalcium phosphate to form a phosphatic skin coating of the desirable glassy, substantially insoluble type. It is also possible to dust the particles with easily fusible alkali metal compounds, provided the particles are sufficiently manipulated so that substantially complete coatings will be formed upon heating.

As an example of the invention, solid crystalline anhydrous monocalcium phosphate was produced by interaction of pure phosphoric acid produced by burning commercially elemental phosphorus and C. P. lime. The anhydrous monocalcium phosphate so produced showed only moderate improvement in reaction rate at heat treatment at 205° C. for a period of one hour.

To this material potassium hydroxide in ethyl alcohol solution was applied and the alcohol evaporated. The following Table I illustrates the results accomplished with various amounts of potassium hydroxide, the coated pure product being heat treated in each case for one hour at 205° C.:

Table I

| Item | Amt. of $K_2O$ added | | | | |
|---|---|---|---|---|---|
| | None | 0.2% | 0.4% | 0.6% | 1.0% |
| Neutralizing value | 88.0 | 83.0 | 81.6 | 78.4 | 81.4 |
| Pyrophosphate content | 0.8 | 1.6 | 1.4 | 2.4 | 2.6 |
| Free acid content | 0.0 | 0.0 | 0.0 | 0.8 | |
| Primary reaction rate cubic centimeters | 100 | 81 | 72 | 72 | 64 |
| Secondary reaction rate do | 56 | 66 | 74 | 73 | 70 |

The terms "Neutralizing value", "Pyrophosphate content", "Primary reaction rate" and "Secondary reaction rate" used in the above table are used in the same sense as in Schlaeger Patent 2,160,232. The reaction rates are "baking powder" rates instead of "dough reaction" rates.

The addition of sodium hydroxide to the pure material in alcoholic solution improved the reaction rate, but to a relatively slight degree.

In another series of examples substantially pure, solid, crystalline, anhydrous monocalcium phosphate was provided with a superficial layer of potassium hydroxide by moistening the surfaces of the crystals with potassium hydroxide solution in 95% ethyl alcohol and evaporating the alcohol at about 125° C. Various amounts of potassium hydroxide were applied, and then the superficially coated particles were treated with 64.8° Bé., $H_3PO_4$ dissolved in 95% ethyl alcohol to convert the coatings respectively to $K_2HPO_4$, $KH_2PO_4$ and $KH_2PO_4.H_3PO_4$. The alcohol was then evaporated and the resulting coated product heat treated for one hour at 200° C. The results of these examples are shown in the following Table II.

Table II

| Calculated compn. of coating | Amt. of KOH added, percent (as $K_2O$) | Neutralizing value | Pyrophosphate content, percent | Baking powder reaction rates | |
|---|---|---|---|---|---|
| | | | | Primary | Secondary |
| | | | | Cc. | Cc. |
| $K_2HPO_4$ | 0.2 | 88.2 | | 74 | 72 |
| | 0.4 | 83.8 | | 64 | 76 |
| | 0.6 | 83.6 | 1.7 | 39 | 97 |
| $KH_2PO_4$ | 0.2 | 85.8 | | 80 | 64 |
| | 0.4 | 85.6 | | 56 | 87 |
| | 0.6 | 82.8 | 1.7 | 24 | 111 |
| $KH_2PO_4.H_3PO_4$ | 0.2 | 87.0 | | 79 | 71 |
| | 0.4 | 85.4 | | 50 | 95 |
| | 0.6 | 84.0 | 1.7 | 22 | 116 |

Similar results were obtained in another series of tests where the heat treatment was conducted at 210° C.

The superficial coatings may be applied by intentionally providing a slight amount of excess free acid in the anhydrous monocalcium phosphate and then neutralizing this free acid with a basic substance such as potassium carbonate. The use of such a method, however, requires great care in order to avoid the presence of excess quantities of fluxing agents which may tend to produce pyrophosphate.

The desired impurities may likewise be added in water solution during the formation of anhydrous monocalcium phosphate as described in my Patent 2,160,700, wherein water is sprayed upon the hot reaction mass in order to control its temperature. This water may be a solution of the desired impurities in the desired amount.

Obviously the herein described processes may be employed to add either all the impurities required, or part of the impurities may be added in other ways, or may be present in the initial materials.

What I claim as new, and desire to secure by Letters Patent, is:

1. In the formation of anhydrous heat-treated monocalcium phosphate having a thin, glassy, substantially complete, relatively insoluble coating, the steps of adding to undesirably pure crystalline monocalcium phosphate a thin superficial film of a soluble potassium phosphate compound and then heating the monocalcium phosphate for a prolonged period at a temperature above 140° C. and below a temperature at which substantial conversion to molecularly dehydrated phosphate occurs to form a thin, glassy, substantially complete, containing less than 3% of pyrophosphate and relatively insoluble coating surrounding an anhydrous monocalcium phosphate core.

2. In the formation of anhydrous heat-treated monocalcium phosphate having a thin, glassy, substantially complete, relatively insoluble coating, the steps of adding to undesirably pure crystalline anhydrous monocalcium phosphate a thin superficial layer of a compound of the class consisting of potassium hydroxide, potassium carbonate and potassium phosphate and then heating the anhydrous monocalcium phosphate for a prolonged period at a temperature above 140° C. and below a temperature at which substantial conversion to molecularly dehydrated phosphate occurs to form a thin, glassy, substantially complete, relatively insoluble coating, the heat-treated composition containing not substantially more than 3% of pyrophosphate.

3. The method as set forth in claim 2, in which the potassium compound is the hydroxide.

4. The method as set forth in claim 2, in which the potassium compound is the hydroxide, and in which the potassium compound is applied in a volatile non-aqueous solvent.

WILLIAM H. KNOX, Jr.